United States Patent
Otake et al.

(10) Patent No.: US 11,245,342 B2
(45) Date of Patent: Feb. 8, 2022

(54) AC POWER SUPPLY DEVICE

(71) Applicant: ROHM CO., LTD., Kyoto (JP)

(72) Inventors: Hirotaka Otake, Kyoto (JP); Tatsuya Miyazaki, Kyoto (JP); Mamoru Tsuruya, Saitama (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 16/967,552

(22) PCT Filed: Nov. 14, 2018

(86) PCT No.: PCT/JP2018/042153
§ 371 (c)(1),
(2) Date: Aug. 5, 2020

(87) PCT Pub. No.: WO2019/159455
PCT Pub. Date: Aug. 22, 2019

(65) Prior Publication Data
US 2021/0234474 A1    Jul. 29, 2021

(30) Foreign Application Priority Data
Feb. 16, 2018 (JP) .............................. JP2018-025816

(51) Int. Cl.
*H02M 7/48* (2007.01)
*H02M 7/487* (2007.01)
(Continued)

(52) U.S. Cl.
CPC ......... *H02M 7/487* (2013.01); *H02M 1/4283* (2021.05); *H02M 7/5395* (2013.01)

(58) Field of Classification Search
CPC .......... H02M 7/42; H02M 7/48; H02M 7/487; H02M 7/5387; H02M 7/4283; H02M 7/53875; H02M 7/5395
See application file for complete search history.

(56) References Cited

U.S. PATENT DOCUMENTS 5,126,585 A * 6/1992 Boys .................. H02M 5/4585
                                                    307/66
5,375,050 A    12/1994 Nakata et al.
(Continued)

FOREIGN PATENT DOCUMENTS

JP    S6359771 A    3/1988
JP    S6447277 A    2/1989
(Continued)

OTHER PUBLICATIONS

Japan Patent Office, International Search Report for PCT/JP2018/042153 dated Jan. 29, 2019.
(Continued)

*Primary Examiner* — Adolf D Berhane
(74) *Attorney, Agent, or Firm* — Fish & Richardson P.C.

(57) ABSTRACT

AC power supply device 1 includes input capacitors 11 and 12 connected at a neutral point X of a three-phase output, transistor bridges 20\* (where * denotes U, V, and/or W) each consisting of PWM control badges **20\*1 and 20\*2** each including two switch elements, transformers T* connected to output terminals of the transistor bridges 20\*, reactors Ls* connected to the transformers T*, smoothing capacitors 40\* connected to the reactors Ls*. The transformers T* are autotransformers including a core 33\* and windings 31\* and 32\* coupled with each other via the core 33\*. One ends of the windings are connected to output terminals of the PWM control bridges **20\*1 and 20\*2**, respectively, while the other terminals are connected to the reactors Ls*. The windings 31\* and 32\* are wound in such directions that magnetic fluxes generated in the core 33\* are cancelled with each other.

18 Claims, 16 Drawing Sheets

(51) Int. Cl.
*H02M 1/42* (2007.01)
*H02M 7/5395* (2006.01)

(56) References Cited

U.S. PATENT DOCUMENTS

| | | |
|---|---|---|
| 5,976,936 A | 11/1999 | Miyajima et al. |
| 6,020,600 A | 2/2000 | Miyajima et al. |
| 6,573,534 B1 | 6/2003 | Kumar et al. |
| 2014/0103364 A1 | 4/2014 | Nakano et al. |
| 2015/0325571 A1 | 11/2015 | Nakano et al. |
| 2016/0254783 A1* | 9/2016 | Unru .................. G01R 31/64 324/658 |
| 2016/0344303 A1 | 11/2016 | Nakano et al. |
| 2016/0377687 A1* | 12/2016 | Niimura ............... G01R 31/42 324/750.01 |
| 2018/0138824 A1 | 5/2018 | Nakano et al. |
| 2019/0173411 A1* | 6/2019 | Jung ...................... H02M 1/44 |
| 2019/0260305 A1 | 8/2019 | Nakano et al. |
| 2020/0212820 A1 | 7/2020 | Nakano et al. |

FOREIGN PATENT DOCUMENTS

| | | |
|---|---|---|
| JP | H04355906 A | 12/1992 |
| JP | H05146160 A | 11/1993 |
| JP | H10308510 A | 11/1998 |
| JP | 2008092651 A | 4/2008 |
| JP | 2013172562 | 9/2013 |
| JP | 2014003051 A | 1/2014 |
| JP | 2016059132 A | 4/2016 |
| JP | 2016540475 A | 12/2016 |
| WO | 2015071378 A1 | 5/2015 |

OTHER PUBLICATIONS

Meynard et al., "Multi-Level Conversion: High Voltage Choppers and Voltage-Source Inverters," IEEE PESC, Laboratoire D'électrotechnique et D'électronique Industrielle, 1992, pp. 397-403.

Nabae et al., "A New Neutral-Point-Clamped PWM Inverter," IEEE Transaction on Industry Applications, Sep./Oct. 1981, 1A-17(5):518-523.

* cited by examiner

AC POWER SUPPLY DEVICE

TECHNICAL FIELD

The invention disclosed in this specification relates to an AC power supply device.

BACKGROUND ART

Switching power supply devices including switch elements and filters such as a DC/DC converter and a DC/AC converter, are currently used in very wide fields such as consumer products, industrial equipment, and in-vehicle products. For these switching power supply devices, small size, light weight and high efficiency are regarded as important, and are demanded more for larger power devices.

Among them, as a high voltage inverter having a high input voltage, a multilevel inverter is used in many cases, in which switching output levels of a bridge unit are not two values of high and low (+E and −E) but can be more values (e.g. a three-level inverter (+E, 0, −E), a five-level inverter (+E, +E/2, −E), and the like).

This reduces voltage applied to an output filter reactor so that the output filter reactor can be downsized or reduced in loss or noise, a reduces voltage applied to each of switch elements so as to adopt a low withstand voltage element that is abundant in the market or reduce switching loss.

As such a multilevel inverter, for example, a neutral point clamped (NPC) type is used, such as a diode clamp inverter (Patent Documents 1 and 2 and Non-Patent Document 1), or a living capacitor inverter (Patent Documents 3 and 4 and Non-Patent Document 2).

LIST OF CITATIONS

Patent Literature

Patent Document 1: JP-A-1-47277
Patent Document 2: JP-A-5-146160
Patent Document 3: JP-A-2008-92651
Patent Document 4: JP-A-2016-59132
Patent Document 5: JP-A-10-308510
Patent Document 6: JP-A-2014-3051

Non-Patent Literature

Non-Patent Document 1:A. Nabae et. al., IEEE Trans. Ind. Appl., vol. 17, No. 5, pp. 518-523, 1981.
Non-Patent Document 2: T. A. Meynard et al., in Conf. Rec. IEEE PESC, vol. 1, pp. 397-403, June 1992.

SUMMARY OF THE INVENTION

Technical Problem

As a switch element in the multilevel inverter described above, a silicon isolated gate bipolar transistor (Si-IGBT) is basically used, and operating conditions such as circuit constants and an operating frequency are adjusted for Si-IGBT.

Note that a basic concept of the multilevel inverter may be considered as reduction of load on the output filter side by adopting multiple steps of the switch element. However, in these methods, two switch elements are connected in series in a current path, and hence a conduction loss of a switch element is apt to occur.

In contrast, research and commercialization of a silicon carbide metal-oxide-semiconductor field effect transistor (SiC-MOSFET), which is a wide bandgap semiconductor and has a high dielectric breakdown strength, have proceeded recently, and higher withstand voltage and lower on-resistance thereof have also proceeded further (see, for example, Patent Documents 5 and 6).

The emergence of this high withstand voltage transistor enables high frequency operation, which is difficult for Si-IGBT, and has made opportunities of reviewing a circuit type for forming the high voltage inverter.

In view of the above-mentioned problem found by the inventors of the present invention, an object of the invention disclosed in this specification is to provide an AC power supply device that can reduce switching loss and total loss (e.g. a high voltage inverter that outputs 400 V AC in three phases and four lines (U, V, and W phases plus a neutral point X)).

Means for Solving the Problem

An AC power supply device disclosed in this specification includes at least two input capacitors connected in series between a first power supply node and a second power supply node, so that a connection node thereof is a neutral point of a three-phase output; three phases of transistor bridges each consisting of first and second PWM control bridges each including two switch elements connected in series between the first power supply node and the second power supply node; three phases of transformers connected to output terminals of the three phases of transistor bridges, respectively; three phases of reactors connected to the three phases of transformers respectively; and three phases of smoothing capacitors connected to the three phases of reactors, respectively. The three phases of transformers are single coil autotransformers, each including a core and first and second windings coupled with each other via the core, one ends thereof being connected to output terminals of the first and second PWM control bridges, respectively, while the other terminals being connected to the smoothing reactors on opposite sides to the smoothing capacitors. The first and second windings are wound in such directions that magnetic fluxes generated in the core are cancelled with each other (first structure).

Note that in the AC power supply device having the first structure, the first and second PWM control bridges turn on and off the switch elements with a phase difference of ½ period therebetween (second structure).

Further, in the AC power supply device having the first or second structure, it is preferred to adopt a structure in which the three phrases of transformers and the three phases of smoothing reactors are formed as three phases of transformer-coupled reactors having both functions (third structure).

Further, in the AC power supply device having the third structure, it is preferred to adopt a structure in which the core is constituted of a combination of at least a first core section and a second core section, and the first and second windings are wound on the first core section in such directions that magnetic fluxes generated in the first core section are cancelled with each other (fourth structure).

Further, in the AC power supply device having the fourth structure, it is preferred to adopt a structure in which the first core section is made of a material having anisotropy in loss due to high frequency magnetic field, the second core section covers at least a part of a side surface of the first core section and is disposed so that magnetic flux passing through the same causes leakage inductance of the transformer-coupled reactor, and the core further includes a magnetic shielding part arranged to limit a path of magnetic flux passing between the first core section and the second core section to a side surface direction of the first core section (fifth structure).

Further in the AC power supply device having the third structure, it is preferred to adopt a structure in which the core further includes a third core section, the first and second core sections ore made of a material having anisotropy in loss due to high frequency magnetic field and are molded so that the loss due to high frequency magnetic field does not chance along a direction of magnetic flux passing the same, the second core section is disposed so that magnetic flux passing the same causes leakage inductance of the transformer-coupled reactor, and the third core section covers at least a part of side surfaces of the first end second core sections and is disposed so that magnetic flux passing the same enables magnetic fluxes generated in the first and second core sections to cook and go each other (sixth structure).

Further, in the AC power supply device having any one of the first to sixth structure, it is preferred to adopt a structure in which according to an output power, an operation of one of the first and second PWM control bridges is stopped, and an operating frequency of the switch element is changed (seventh structure).

Further in the AC power supply device having any one of the first to seventh structures, it is preferred to adopt a structure in which according to an output voltage, an on-duty of the switch element is limited (eighth structure).

Further, an the AC power supply device having any one of the first to eighth structures, it is preferred to adopt a structure in which the switch element is made of a wide bandgap semiconductor (ninth structure).

Further, an AC power supply device disclosed in this specification includes two input capacitors connected in series between a first power supply node and a second power supply node; first and second PWM control bridges each including two switch elements connected in series between the first power supply node and the second power supply node; and a transformer having one end connected to output terminals of the first and second PWM control bridges and the other end connected to one end of a load, in which the other end of the load is connected to a connection node of the two input capacitors (tenth structure).

Note that in the AC power supply device having the tenth structure, it is preferred to adopt a structure further including a smoothing capacitor connected in parallel to the load (eleventh structure).

Further, in the AC power supply device having the first structure, it is preferred to adopt a structure further including three phases of load circuits having a neutral point connected to the other ends of the three phases of reactors, in which the neutral point is connected to the connection node of the two input capacitors (twelfth structure).

Further, a transformer-coupled reactor disclosed in this specification, which is used for a power supply device, includes a first core section formed in an annular shape; a second core section disposed inside the annular shape of the first core section so that a part of the second core section has intimate contact with the first core section and that a first winding is wound on the first core section and the second core section; a third core section disposed inside the annular shape of the first core section so that a part of the third core section has intimate contact with the first core section and that a second winding is wound on the first core section and the third core section; a fourth core disposed to cover at least a part of side surfaces of the first core section and the second core section, so that magnetic flux passing the same enables magnetic fluxes generated in the first core section and the second core section to come and go each other; and a fifth core disposed to cover at least a part of side surfaces of the first core section and the third core section, so that magnetic flux passing the same enables magnetic fluxes generated in the first core section and the third core section to come and go each other (thirteenth structure).

Advantageous Effects of the Invention

According to the invention disclosed in this specification, it is possible to provide an AC power supply device (such as a high voltage inserter) that can reduce switching loss and total loss.

DESCRIPTION OF EMBODIMENTS

AC Power Supply Device (Overall Structure)

Figure 1:
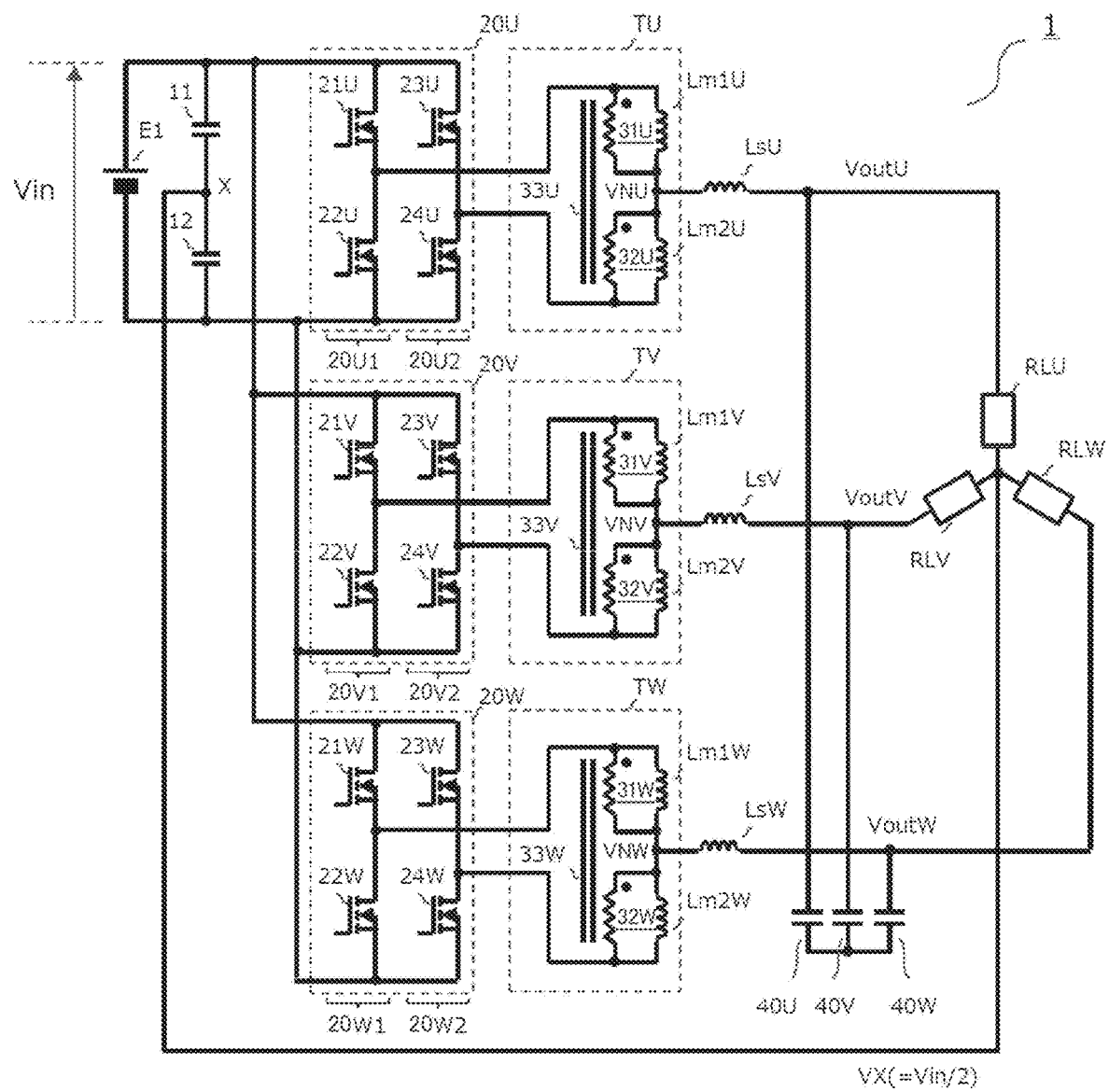
FIG. 1 is a circuit diagram illustrating an overall structure of an AC power supply device.

FIG. 1 a circuit diagram illustrating an overall structure of an AC power supply device. An AC power supply device 1 of this structural example is a DC/AC converter (a so-called high voltage inverter), which converts, a DC input voltage Vin supplied from a DC power supply E1 (a low potential side of Vin is a ground point, though it is not shown in this diagram) into three pluses of AC output voltages Vout* (where * denotes U, V, and or W; the same is true hereinafter), so as to supply the same to loads RL*, and it includes input capacitors 11 and 12, transistor bridges 20*, autotransformers T*, smoothing reactors Ls*, and smoothing capacitors 40*.

The input capacitors 11 and 12 are connected in series between a positive terminal (i.e. an application terminal of the DC input voltage Vi) and a negative terminal (i.e. a ground terminal) of the DC power supply E1, in such a manner that a connection node thereof is a neutral point X of the three phases of AC output voltages Vout* (i.e. an application terminal of a neutral point voltage VX), and function as a capacitor bridge. Note that if the input capacitors 11 and 12 have the same capacitance value, VX=Vin/2 holds. When operating with this structure, a voltage between a midpoint VN* of the autotransformer T* and the neutral point X is clamped at the neutral point X and varies at a frequency twice of an operating frequency fx of switch elements 21* to 24*, and hence an inductance value necessary for the smoothing reactors Ls* can be half of that of an NPC type inverter, so that downsizing and lower loss can be achieved.

The transistor bridge 20* is constituted of two pulse width modulation (PWM) control bridges 20*1 and 20*2. The PWM control bridges 20*1 and 20*2 respectively include switch elements 21* and 22*, and switch elements 23* and 24* (which are N-channel type MOSFETs in the example of this diagram) connected in series between the positive terminal and the negative terminal of the DC power supply E1, and the switch elements are complementarity turned on and off with a predetermined phase difference (e.g. a phase difference of ½ period) and will a predetermined dead time, so as to perform an interleaved operation. Note that DUTY of the PWM control budges 20*1 and 20*2 (DUTY=Ton/T, where T denotes a switching period (i.e. 1/fx), and Ton denotes an on-period of each of the switch elements 21* and 23*) is appropriately PWM-controlled so that a desired AC waveform can be generated.

The autotransformer T* is connected between output terminals of the PWM control bridges 20*1 and 20*2 and the smoothing reactor Ls*. If each magnetizing inductance Lm1*, Lm2* of the autotransformer T* is larger enough than the smoothing reactor Ls*, even if the midpoint VN of the autotransformer T is cut off to divide into two smoothing reactors Ls1 and Ls2 as illustrated in FIG. 2B, the same operation is obtained. With reference to FIG. 1 again, description of the autotransformers T* is continued. The autotransformer T* includes a first winding 31*, a second winding 32*, and a core 33*. More specifically, a first end (i.e. a winding start end) of the first winding 31* is connected to the output terminal of the PWM control bridge 20*1 (i.e. a connection node of the switch elements 21* and 22*). A first end (i.e. a winding finish end) of the second winding 32* is connected to an output terminal of the PWM control bridge 20*2 (i.e. a connection node of the switch elements 23* and 24*). A second end (i.e. a winding finish end) of the first winding 31* and a second end (i.e. a winding start end) of the second winding 32* are commonly connected to a first end of the smoothing reactor Ls*. Further, the first winding 31* and the second winding 32* are magnetically coupled with each other via the core 33*. In particular, the first winding 31* and the second winding 32* are wound in such directions that magnetic fluxes generated in the core 33* are cancelled with each other (details will be described later).

Second ends of the smoothing reactors Ls* are connected to first ends of the loads RL* (i.e. output terminals of the AC output voltages Vout*), and first ends of the smoothing capacitors 40* are connected to the first ends of the loads RL*. Second ends of the smoothing capacitors 40* are commonly connected in three phases. The smoothing capacitors 40* connected in this manner constitute LC filters together with the smoothing reactors Ls*, so as to smooth the AC output voltages Vout*.

Note that second ends of the loads RL* are connected to the neutral point X. In this way, the neutral point X is a reference potential point that is common to all the three phases of AC output voltages Vout*. Therefore, it can support three phases and four lines (U, V, and W phases plus a neutral point X), which is the mainstream in Europe and the like.

Basic Operation

In the following description, a basic operation of the AC power supply device 1 is described. Note that in order to understand the basic operation, it is sufficient to use a circuit of a single-phase portion instead of the circuit of three phases.

Figure 2A:
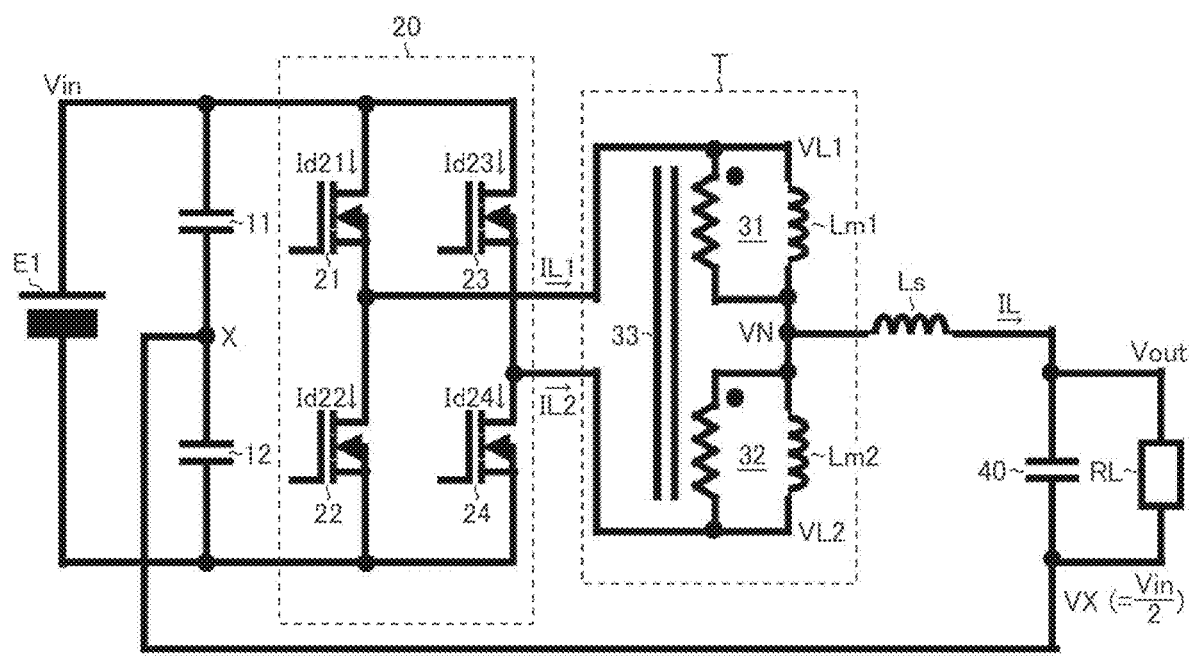
FIG. 2A is a circuit diagram showing a single-phase portion of the AC power supply device illustrated in FIG. 1.
Figure 2B:
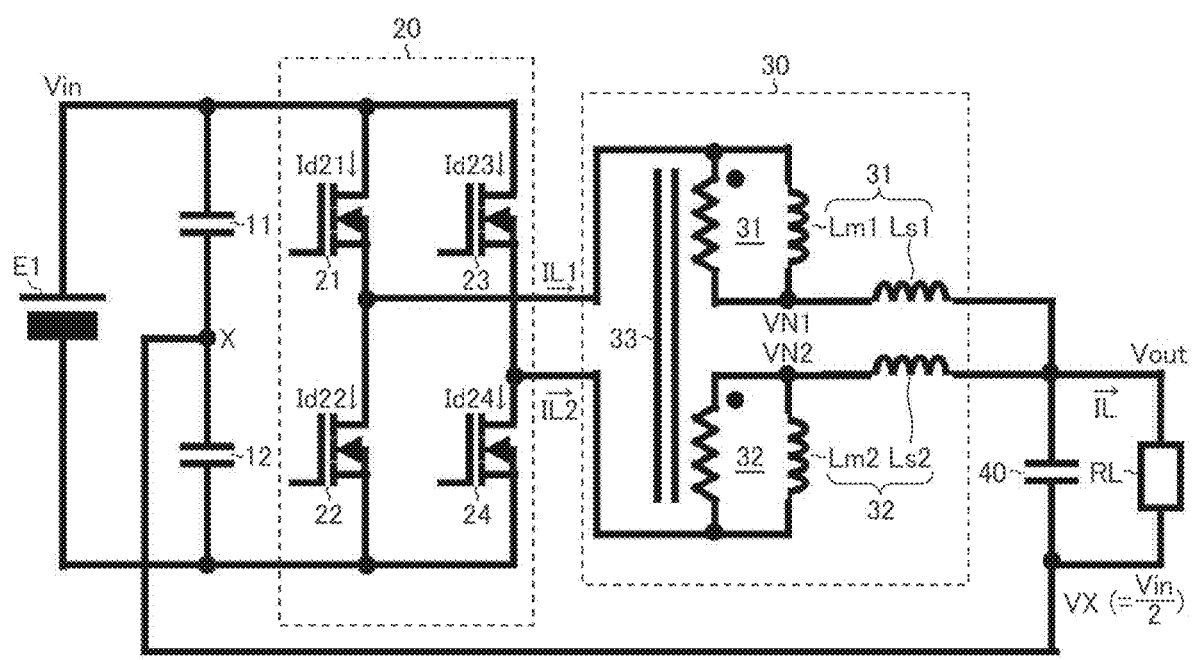
FIG. 2B is a circuit diagram in which the transformer and the reactor illustrated in FIG. 1 are constituted of a transformer-coupled reactor.

FIG. 2A is a circuit diagram showing a single-phase portion of the AC power supply device 1 illustrated in FIG. 1 (i.e. a circuit diagram in which one of U, V, and W phases is extracted). Note that in this illustration of a single-phase portion, the suffix * denoting a phase (i.e. U, V, or W) of each component is omitted. On the other hand, in this diagram, drain currents of the switch elements 21 to 24 are denoted by Id21 to Id24, inductor currents of the first winding 31 and the second winding 32 are denoted by IL1 and IL2, and inductor current flowing in the load RL is denoted by IL, so that they are explicitly shown. These symbols are used in other drawings, too. Further, arrow directions of the drain currents Id21 to Id24, the inductor currents IL1 and IL2, and the inductor current IL are defined as positive directions. Further, node voltages at the output terminals of the two transistor bridges are denoted by VL1 and VL2, and a node voltage at the connection point of the magnetizing inductances Lm1 and Lm2 of the autotransformer T and the smoothing reactor Ls is denoted by VN.

Note that if the magnetizing inductances Lm1 and Lm2 of the autotransformer T are larger enough than the smoothing reactor Ls, the autotransformer T and the smoothing reactor Ls can be constituted of a transformer-coupled reactor 30 that is a single component, as illustrated in FIG. 2B. In this case, the smoothing reactor Ls is constituted of the leakage inductances Ls1 and Ls2 of the two windings 31 and 32 of the autotransformer T, and the inductor current IL is the sum of the inductor currents IL1 and IL2 flowing in the two leakage inductances Ls1 and Ls2, respectively. Further, node voltages VN1 and VN2 between a connection part and the leakage inductances Ls1 and Ls2 have substantially the same potential under the above conditions.

Operating states of the AC power supply device 1 can be roughly classified into the following three states (1) (0≤DUTY<0.5, and Vout<0 V,
(2) DUTY=0.5 and Vout=0 V, and
(3) 0.5<DUTY≤1, and Vout>0 V.

Therefore, in the following description, with reference to FIG. 2A, the above three operating states are described in detail while dividing cases.

Figure 3:
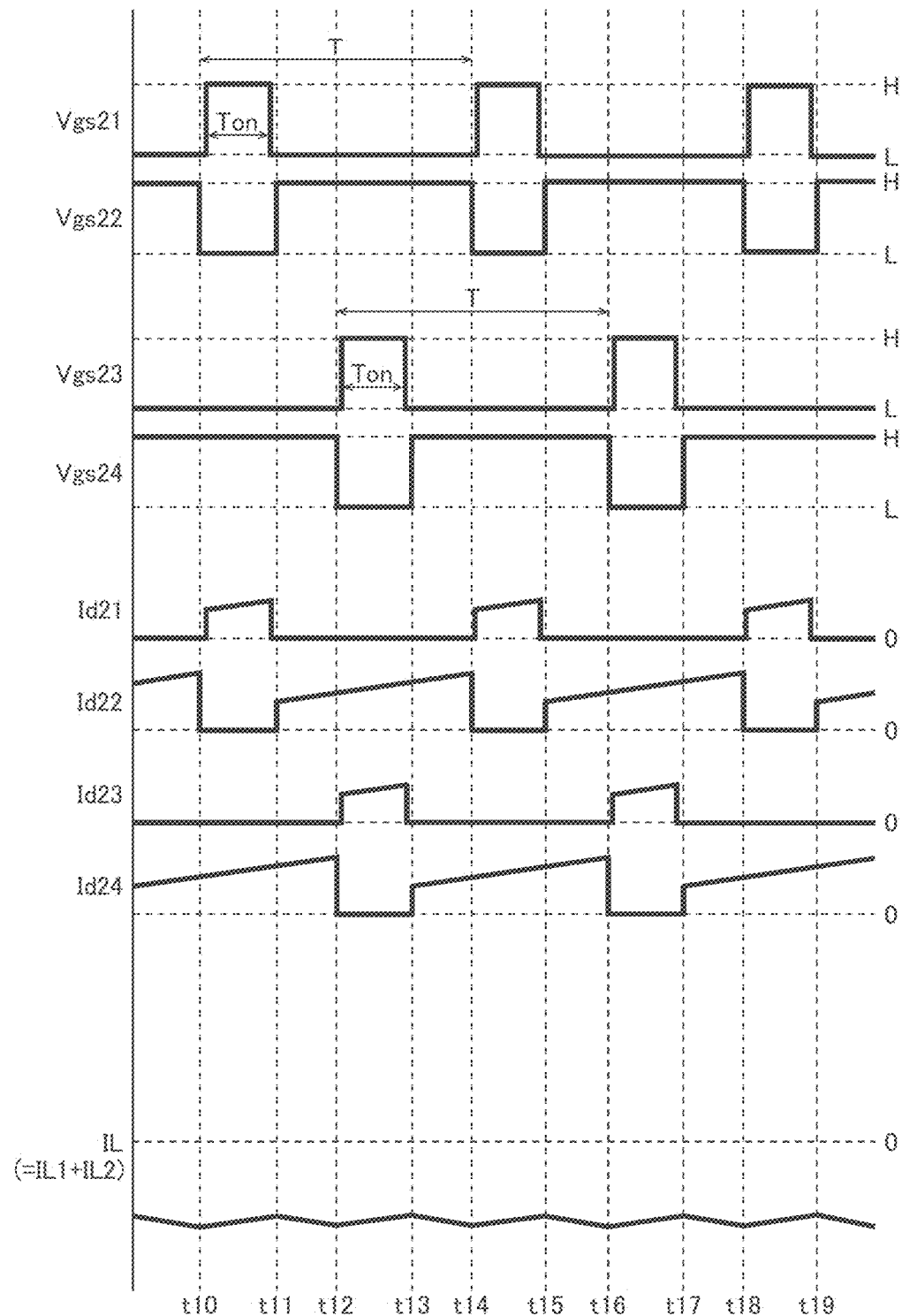
FIG. 3 is a timing chart for explaining a basic operation of the AC power supply device when $0 \leq DUTY < 0.5$ holds.

FIG. 3 is a timing chart for explaining a basic operation of the AC power supply device 1 when 0≤DUTY<0.5 holds, in which gale-source voltages Vgs21 to Vgs24 of the switch elements 21 to 24, the drain currents Id21 to Id24 of the switch elements 21 to 24, and the inductor current IL (=IL1+IL2) are shown in order from top to bottom.

As illustrated in this chart, the switch elements 21 and 22 and the switch elements 23 and 24 are complementarily turned on and off at a predetermined switching period T (=1/fx). Further, there is a phase difference of ½ period between a drive phase of the switch elements 21 and 22 and a drive phase of the switch elements 23 and 24.

Here the first winding 31 and the second winding 32 of the autotransformer 7 are magnetically coupled with each other. Therefore, when current flows in one of them, current also flows in the other in the same direction. As a result, the inductor currents IL1 and IL2 that flow in the first winding 31 and the second winding 32, respectively, have the same behavior. In other words, the inductor currents IL1 and IL2 modulated with a frequency twice the operating frequency flow in the first winding 31 and the second winding 32 (and hence the inductor current IL that is the sum of them flows).

Note that when 0≤DUTY<0.5 holds, there occurs a simultaneous on-period of the switch elements 22 and 24 (see time point t11 to t12, t13 to t14, t15 to t16, and t17 to t18), and hence the negative inductor current IL flows. This point is described in detail below.

Figure 4:
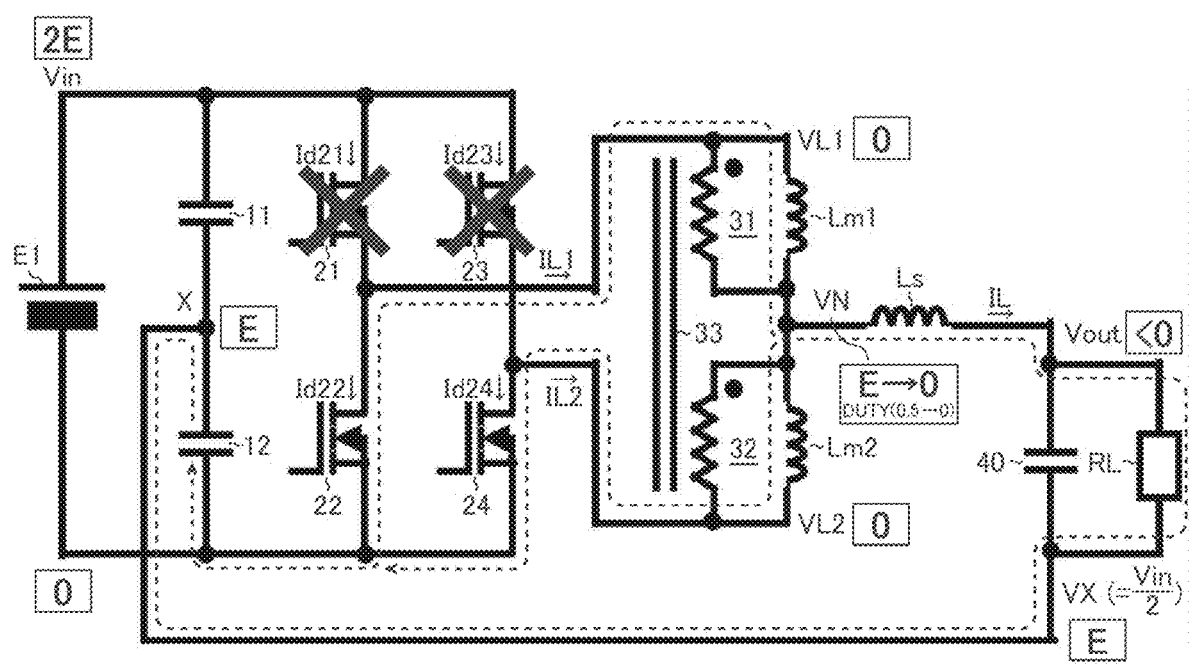
FIG. 4 is an equivalent circuit diagram illustrating a main current path of the AC power supply device when $0 \leq DUTY < 0.5$ holds.

FIG. 4 is an equivalent circuit diagram illustrating a main current path in the AC power supply device 1 when 0≤DUTY<0.5 holds (i.e. a path of current flowing in the simultaneous on-period of the switch elements 22 and 24). Note that in this diagram, a case where Vin=2E and VX=E (=Vin/2) hold is exemplified and described. Further, in the following description, unless otherwise noted, a voltage value of the AC output voltage Vout means a voltage value with respect to the neutral point voltage VX (=E) as a reference potential.

As shown by a broken line arrow in this diagram, the input capacitor 12 works its a DC power supply during the simultaneous on-period of the switch elements 22 and 24 and current flows in the path of the input capacitor 12, the load RL, the leakage inductance Ls, the magnetizing inductances Lm1 and Lm2, the switch elements 22 and 24, and the input capacitor 12 in order. Therefore, the inductor current IL has a negative value (see also FIG. 3).

Further, in this case, the node voltages VL1 and VL2 at first ends of the magnetizing inductances Lm1 and Lm2, respectively, are both zero, because the switch elements 22 and 24 are both ON. On the other hand, the node voltage VN at a common second end of the magnetizing inductances Lm1 and Lm2 is E when DUTY is 0.5, and is zero when DUTY is zero.

Therefore, when 0≤DUTY<0.5 holds, the AC output voltage Vout has a negative value (<0) with respect to the neutral point voltage VX, and an absolute value thereof is larger as DUTY is smaller. Specifically, when DUTY is 0.5, Vout is zero and when DUTY is zero, Vout is −E.

Figure 5:
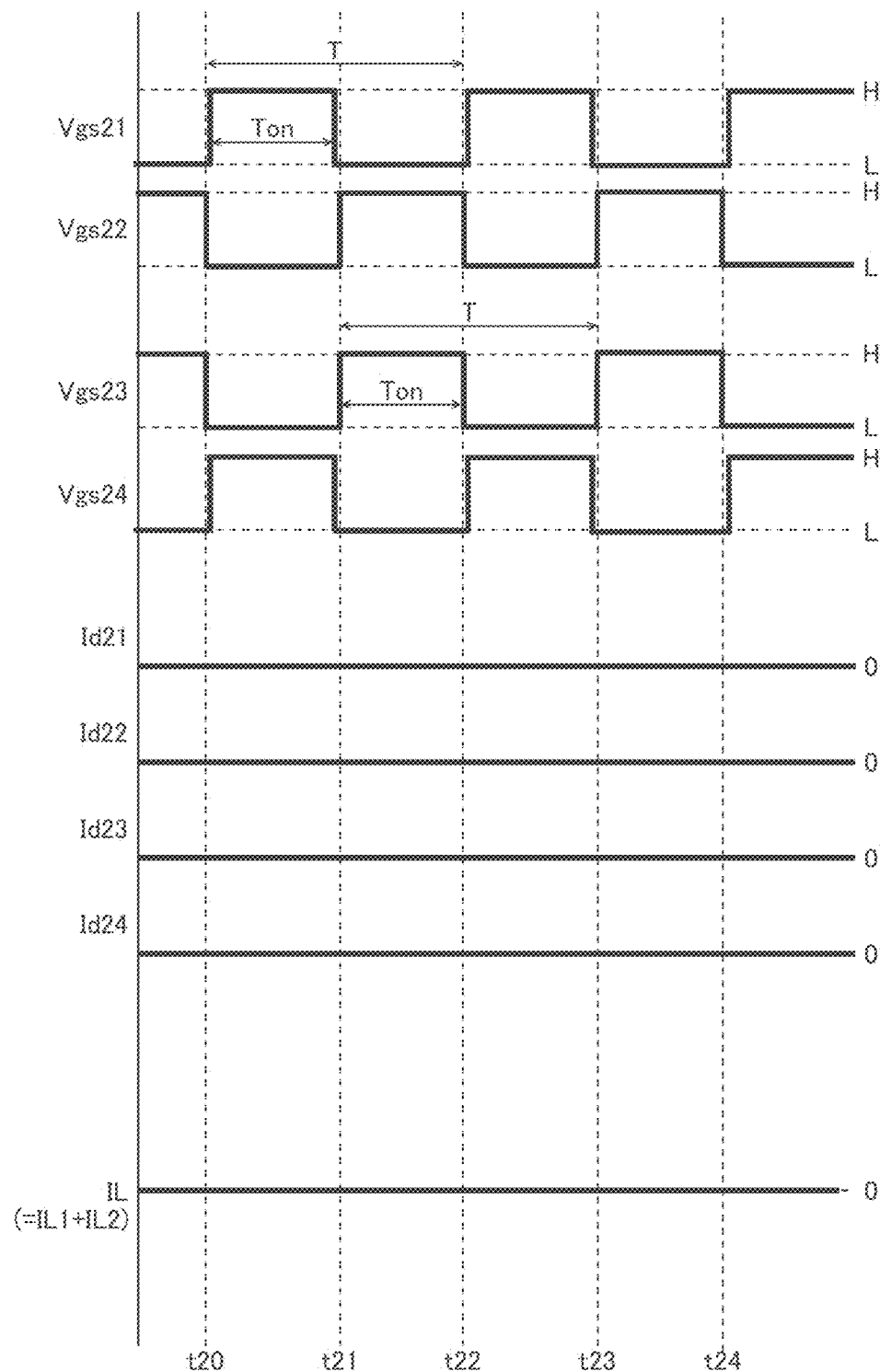
FIG. 5 is a timing chart for explaining a basic operation of the AC power supply device when DUTY is 0.5.

FIG. 5 is a timing chart for explaining a basic operation of the AC power supply device 1 when DUTY is 0.5, and similarly to FIG. 3, the gate-source voltages Vgs21 to Vgs24 of the switch elements 21 to 24, the drain currents Id21 to Id24 of the switch elements 21 to 24, and the inductor current IL (=IL1+IL2) are shown in order from top to bottom.

As illustrated in this chart, when DUTY is 0.5, neither the simultaneous on-period of the switch elements 21 and 23 nor the simultaneous on-period of the switch elements 22 and 24 occurs, and hence no current flows except in the magnetizing inductances Lm1 and Lm2. This point is described in detail below.

Figure 6:
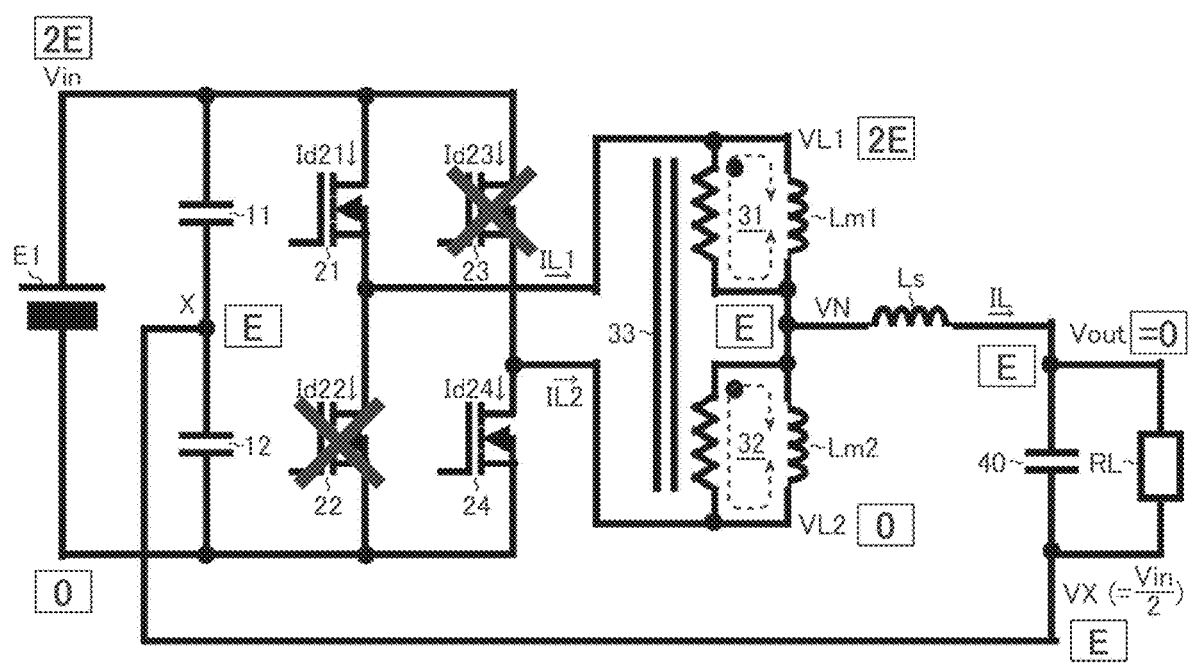
FIG. 6 is an equivalent circuit diagram illustrating a main current path of the AC power supply device when DUTY is 0.5.

FIG. 6 is an equivalent circuit diagram illustrating a main current path in the AC power supply device 1 when DUTY is 0.5 (i.e. a state where no current flows except in the magnetizing inductances Lm1 and Lm2). Note that in this diagram similarly to FIG. 4, a case where Vin=2E and VX=E (=Vin/2) hold is exemplified and described. Further, in this diagram, the simultaneous co-period of the switch elements 21 and 24 (i.e. time point t20 to t21, and t22 to t23 in FIG. 5) is exemplified and described.

In the simultaneous on-period of the switch elements 21 and 24, the node voltage VL1 at the first end of the magnetizing inductance Lm1 is 2E, because the switch element 21 is ON. On the other hand, the node voltage VL2 at the first end of the magnetizing inductance Lm2 is zero, because the switch element 24 is ON. Therefore, the node voltage VN at a common second end of the magnetizing inductances Lm1 and Lm2 is E and is the same potential as the neutral point voltage VX (=E) when Lm1=Lm2 holds. As a result, the inductor current IL does not flow in the leakage inductance Ls, and a voltage applied to the load RL is also E (=VX), so that Vout is zero.

Figure 7:
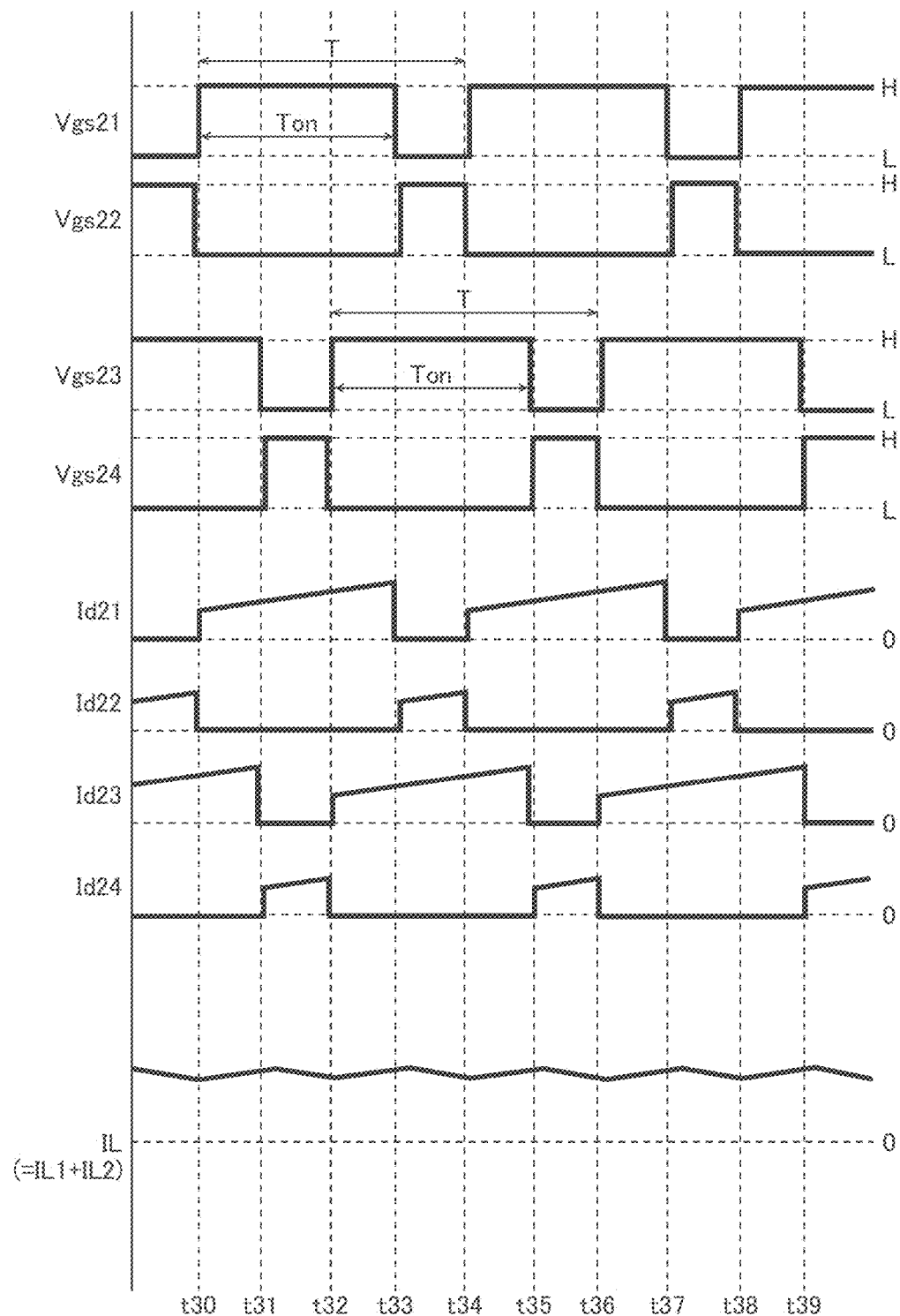
FIG. 7 is a timing chart for explaining a basic operation of the AC power supply device when $0.5 < DUTY \leq 1$ holds.

Note that in this diagram, the simultaneous on-period of the switch elements 21 and 24 is exemplified, but also in the simultaneous on-period of the switch elements 22 and 23 (i.e. time point t21 to t22, and t23 to t24 in FIG. 5), no current flows except in the magnetizing inductances Lm1 and Lm2, and Vout is zero, though the node voltages VL1 and VL2 are opposite to those described above (VL1=0 and VL2=2E, FIG. 7 is a timing chart for explaining a basic operation of the AC power supply device 1 when 0.5<DUTY≤1 holds, and similarly to FIGS. 3 and 5, the gate-source voltages Vgs21 to Vgs24 of the switch elements 21 to 24, the drain currents Id21 to Id24 of the switch elements 21 to 24, and the inductor current IL (=IL1+IL2) are shown in order from top to bottom.

As illustrated in this chart, when 0.5<DUTY≤1 holds, there occurs the simultaneous on-period of the switch elements 21 and 23 (see time point t30 to t31, t32 to t33, t34 to t35, t36 to t37, and t38 to t39), and hence the positive inductor current IL flows. This point is described in detail below.

Figure 8:
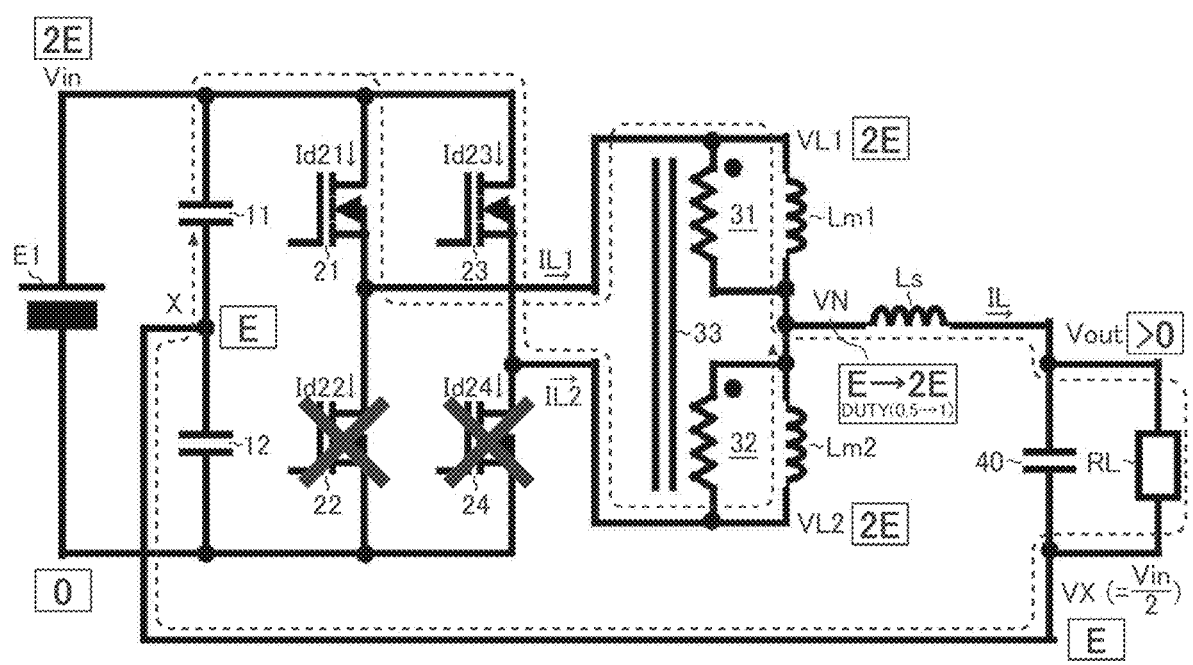
FIG. 8 is an equivalent circuit diagram illustrating a main current path of the AC power supply device when $0.5 < DUTY \leq 1$ holds.

FIG. 8 is an equivalent circuit diagram illustrating a main current path in the AC power supply device 1 when 0.5<DUTY≤1 holds (i.e. a path of current flowing in the simultaneous on-period of the switch elements 21 and 23). Note that in this diagram, similarly to FIGS. 4 and 6, a case where Vin=2E and VX=E (=Vin/2) hold is exemplified and described.

As shown by a broken line arrow in this diagram, the input capacitor 11 works as a DC power supply during the simultaneous on-period of the switch elements 21 and 23, and hence current flows in the path of input capacitor 11, the switch elements 21 and 23, the magnetizing inductances Lm1 and Lm2, the leakage inductance Ls, the load RL, and the input capacitor 11 in order. Therefore, live inductor current IL has a positive value (see also FIG. 7).

Further, in this case, the node voltages VL1 and VL2 at first ends of the magnetizing inductances Lm1 and Lm2 are both 2E, because the switch elements 21 and 23 are ON. On the other hand, the node voltage VN at the common second end of the magnetizing inductances Lm1 and Lm2 is E when DUTY is 0.5, and is 2E when DUTY is one Therefore, when 0.5<DUTY≤1 holds the AC output voltage Vout has a positive value (>0) with respect to the neutral point voltage VX, and an absolute value thereof is larger as DUTY is larger. Specifically, when DUTY is 0.5, Vout is zero, and when DUTY is one, Vout=+E. Note that by setting a maximum value of DUTY to be smaller than one, and by setting a minimum value to be larger than zero, an amplitude of the output voltage can be adjusted within a range of ±E.

In this way, the inverter method of the present invention can output Vout up to ±E when Vin is 2E, and it can output the same as three phases. In comparison with an NPC type inverter, a three-phase and three-level inverter of double frequency using the autotransformer T and the inverter of the present invention have the some voltage waveform applied to a reactor of a filter circuit (the smoothing reactor Ls in FIG. 2A of the present invention). Therefore, the inductance value necessary for the smoothing reactor Ls in the inverter of the present invention is half of that of the three-level inverter, and the merit of downsizing can be still obtained even if the autotransformer T is added. Further, in comparison with a circuit in which switch elements are connected in series like the three-level inverter, the inverter of the present invention includes the switch elements connected in parallel, and hence a conduction loss can be reduced due to reduction in current, and output capacitance can be increased by utilizing its feature.

Figure 9:
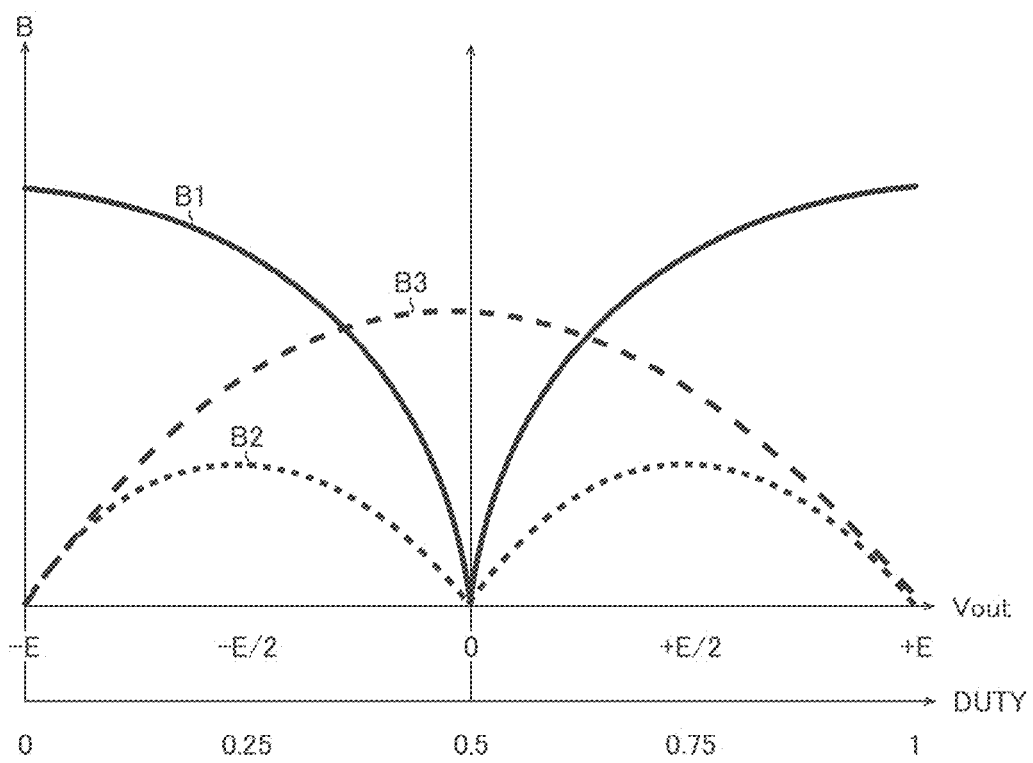
FIG. 9 is a diagram illustrating a behavior of magnetic flux density in this structural example.

Examination About Magnetic Flux Densities of Autotransformer and Smoothing Reactor FIG. 9 is a correlation diagram between Vout and DUTY (horizontal axis) and magnetic flux densities B of the autotransformer T and the smoothing reactor Ls (vertical axis). Note that a solid line B1 indicates a DC component of the smoothing reactor Ls (i.e. a density of magnetic flux generated by a DC current component flowing in the smoothing reactor Ls), and a small broken line B2 indicates an AC component of the reactor Ls (i.e. a density of magnetic flux generated by an AC current component flowing in the smoothing reactor Ls). On the other hand, a large broken line B3 indicates a magnetizing component of the autotransformer T (i.e. a density of magnetic flux generated in the core 33 by the inductor currents IL1 and IL2 flowing in the magnetizing inductances Lm1 and Lm2).

As described above, in the AC power supply device 1 of this structural example, $-E \leq Vout<0$ is satisfied when $0 \leq DUTY<0.5$ holds Vout is zero when DUTY is 0.5, and $0<Vout \leq +E$ is satisfied when $0.5<DUTY \leq 1$ holds.

Further, noting the smoothing reactor Ls, the magnetic flux density is high when $|Vout|>E/2$ holds (see the solid line B1). On the other hand, noting the magnetizing component of the autotransformer T, the magnetic flux density of the core 33 is high when $|Vout|<E/2$ holds (see the large broken line B3). More directly, when Vout is zero, B1 is minimum while B3 is maximum, and when Vout is ±E, B1 is maximum while B3 is minimum. In other words, in the AC power supply device 1 of this structural example, a heavy load area is clearly divided between the autotransformer T and the smoothing reactor Ls.

Note that it is desired that the autotransformer T and the smoothing reactor Ls used in the AC power supply device 1 of this structural example should have a smoothing inductance that hardly cause magnetic saturation also in an output having a large crest factor and is necessary for continuously operating in a wide drive range. In the following description, as means for satisfying this requirement, the novel transformer-coupled reactor 30 (in particular, a novel structure of the core 33) is proposed.

Transformer-Coupled Reactor (First Embodiment)

Figure 10:
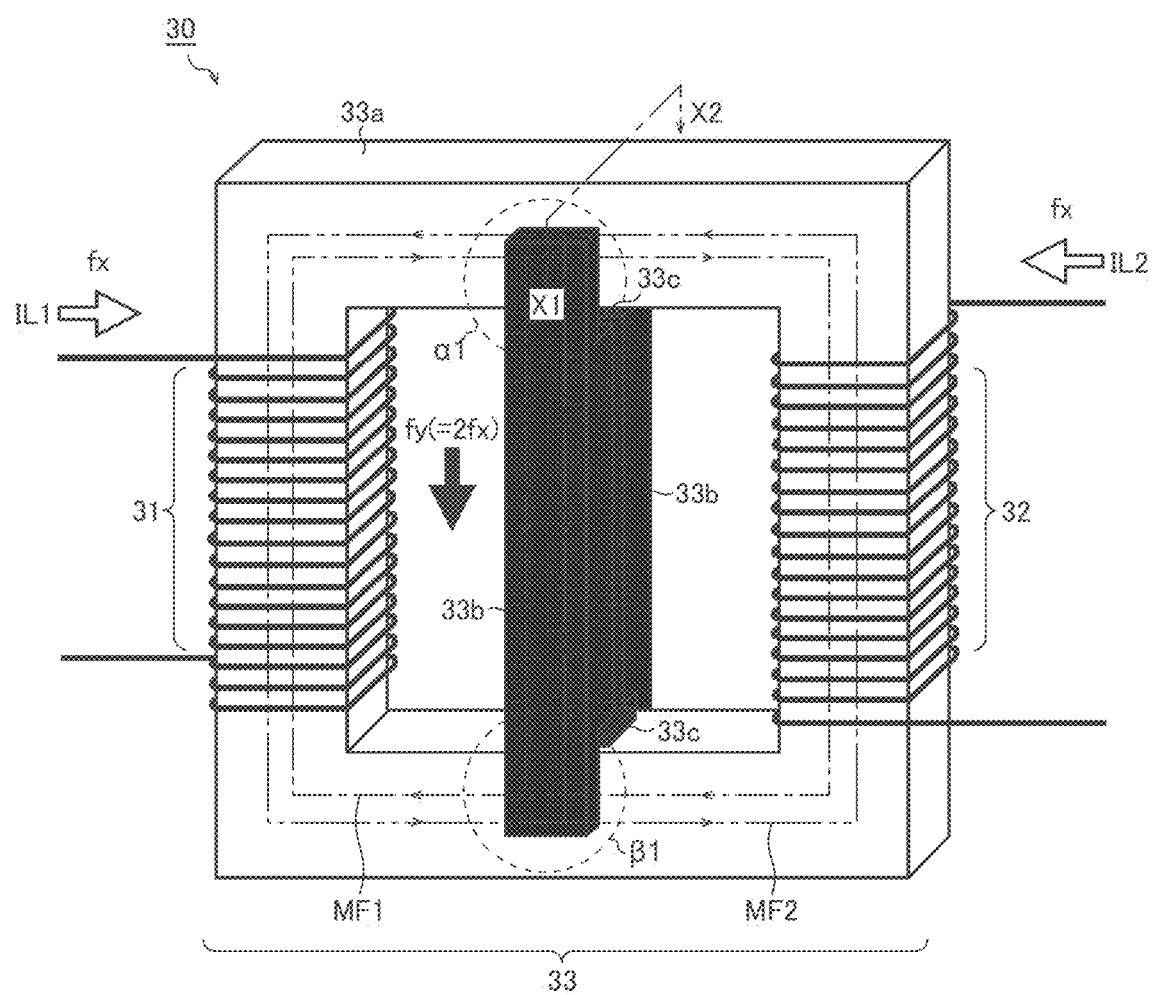
FIG. 10 is a schematic diagram illustrating a first embodiment of the transformer-coupled reactor.
Figure 11:
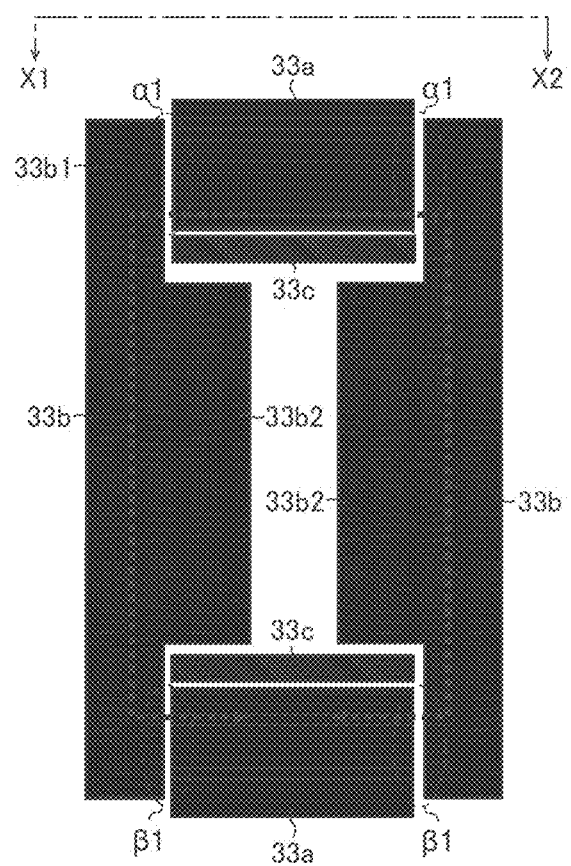
FIG. 11 is an X1-X2 sectional view.

FIG. 10 is a schematic diagram illustrating a first embodiment of the transformer-coupled reactor 30, and FIG. 11 is a longitudinal sectional view of live transformer-coupled reactor 30 (an X1-X2 sectional view in FIG. 10). As described above, the transformer-coupled reactor 30 of this embodiment includes the first winding 31, the second winding 32, and the core 33. In particular, the core 33 is constituted of a combination of a first core section 33a and a second core section 33b that is separate from the same.

The first core section 33a is a member having an annular shape on which the first winding 31 and the second winding 32 are wound, and functions as a magnetic leg part. Note that the first winding 31 and the second winding 32 are wound on the first core section 33a in such directions that magnetic fluxes MF1 and MF2 generated in the first core section 33a are cancelled with each other.

By adopting this structure, in the first core section 33a, only magnetic flux ΔMF due to a difference between the inductor current IL1 flowing in the first winding 31 and the inductor current IL2 flowing in the second winding 32 (ΔMF=MF1−MF2) is generated, and hence magnetic saturation hardly occurs.

On the other hand, the second core section 33b is a rod-like member on which neither the first winding 31 nor the second winding 32 is wound, and functions as a so-called path core. Note that the second core section 33b is disposed so that the magnetic fluxes MF1 and MF2 passing the same cause leakage inductance of the transformer-coupled reactor 30. For instance, as illustrated in this diagram, it is preferred to dispose the second core section 33b so as to bridge connection parts α1 and β1 of the first core section 33a.

Note that the connection part α1 is a part at which the magnetic fluxes MF1 and MF2 are split from the first core section 33a to the second core section 33b, and in the example of this diagram, side surfaces of on upper beam part of the first core section 33a corresponds to this. On the other hand, the connection part β1 is a part at which the magnetic fluxes MF1 and MF2 are joined from the second core section 33b to the first core section 33a, and in the example of this diagram, side surfaces of a lower beam part of the first core section 33a corresponds to this.

As illustrated in FIG. 28, in addition to the magnetizing inductances Lm1 and Lm2 magnetically coupled with each other, the leakage inductances Ls1 and Ls2 due to the magnetic fluxes split from the first core section 33a to the second core section 33b are generated in the transformer-coupled reactor 30.

These leakage inductances Ls1 and Ls2 can be used as smoothing reactors for forming the LC filter together with the smoothing capacitor 40. Therefore, when the first core section 33a and the second core section 33b are separate from each other, by appropriately designing physical properties of the first core section 33a and physical properties and a shape of the second core section 33b, it is possible to arbitrarily adjust characteristics as the smoothing reactor. As a result, the compact transformer-coupled reactor 30 having the desired leakage inductances Ls1 and Ls2 can be realized, and hence it can contribute to downsizing of live entire AC power supply device 1.

In this way, one of features of the transformer-coupled reactor 30 of this embodiment is that the first core section 33a and the second core section 33b are separately disposed. However, it is not necessary that the first core section 33a and the second core section 33b are made of different materials. For instance, even if the first core section 33a and the second core section 33b are made of the same material, if they are separately disposed, it is easier to change a shape and a cross-sectional area (i.e. an area of a cross section perpendicular to a direction of the magnetic flux penetrating the second core section 33b) of the second core section 33b than in a case where they are integrally molded, and hence characteristics as the smoothing reactor can be arbitrarily adjusted.

Note that if trying to get the equivalent leakage inductance as described above by using a conventional core in which the magnetic leg part and the path core are integrally molded (so-called E type cores), it is necessary to form a large gap in the path core, and hence air emission magnetic flux is increased.

On the other hand, in the transformer-coupled reactor 30 of this embodiment, it is not always necessary to form a gap in the second core section 33b, and hence air emission magnetic flux can be largely reduced. Therefore, a malfunction of a control circuit element and eddy current loss in a circuit pattern around the transformer-coupled reactor 30 can also be reduced, and hence it is possible to realize the AC power supply device 1 with little malfunction and power loss.

Further, the first core section 33a can be designed separately from the leakage inductance generation described above. Therefore, the design flexibility is improved, and it is possible to realize cost reduction in selecting the material.

With reference to FIGS. 10 and 11 again, description of the transformer-coupled reactor 30 is continued. In the transformer-coupled reactor 30 of this embodiment, when driving the two PWM control bridges of the transistor bridge 20 with a phase difference of ½ period between them, the second core section 33b that generates the leakage inductance is disposed so that a changing frequency fy of the magnetic flux passing the same is a frequency (e.g. 40 kHz (=2×fx)) higher than the operating frequency fx of the PWM control bridge (e.g. 20 kHz).

By adopting this structure, the inductance values of the leakage inductances Ls1 and Ls2 necessary for forming the LC filter are reduced. Specifically, by the reduction in necessary leakage inductance value due to current vibration at a frequency twice the operating frequency fx, and by the reduction in necessary leakage inductance due to the reduction in the voltage applied to each of the leakage inductances (a value obtained by subtracting a voltage applied to the reactor connection part 30 from a difference between input and output voltages), the inductance value necessary for obtaining the same output current can be reduced to approximately ½, compared with a case where a single PWM control bridge and a smoothing reactor are used (a case of using a capacitor bridge). Therefore, downsizing and cost reduction due to the reduction in she cross-sectional area of the second core section 33b, downsizing of the input capacitors 11 and 12 nod the smoothing capacitor 40, and the like can be realized. On the contrary, by using the same core cross-sectional area as in the case where the single PWM control bridge is used, approximately twice the current can be allowed. In the AC power supply device 1 having a large crest factor, the effect of the above-mentioned downsizing is particularly large.

Further, in the transformer-coupled reactor 30 of this embodiment total magnetic flux, which is the sum of the magnetic flux MF1 due to the first winding 31 and the magnetic flux MF2 due to the second winding 32, penetrates the second core section 33b. In other words, magnetic flux of higher density is eventually generated in the second core section 33b than in the first core section 33a. In view of this, it is desired that a saturated magnetic flux density of the second core section 33b should be higher than or equal to that of the first core section 33a. According to this core design, the second core section 33b having a smaller cross-sectional area can be adopted, and hence downsizing of the transformer-coupled reactor 30 (therefore downsizing of the AC power supply device 1) can be realized.

However, if the amount of the magnetic flux leaking from live first core section 33a to the second core section 33b is too large, the magnetizing inductances Lm1 and Lm2 become small, and disposing the transformer-coupled reactor 30 is made meaningless. Therefore, if a relative permeability of the second core section 33b is large, a necessary minimum gap (within a permissible range of the air emission magnetic flux) should be formed in the second core section 33b, so as to adjust balance between the saturated magnetic flux density and the relative permeability.

As described above, the transformer-coupled reactor 30 of this embodiment can realize the compact smoothing reactor having the leakage inductances Ls1 and Ls2 large enough to continuously operate in a wide drive range, while suppressing magnetic saturation in output having a crest factor. Thus, it is possible to provide the compact AC power supply device with high efficiency and little malfunction.

Further, in the transformer-coupled reactor 30 of this embodiment, the first core section 33a is formed using a material having anisotropy in loss due to high frequency magnetic field the shape and layout of the second core section 33b are devised, and a magnetic shielding pan 33c is disposed. In the following description, this point is described in detail.

Figure 12:
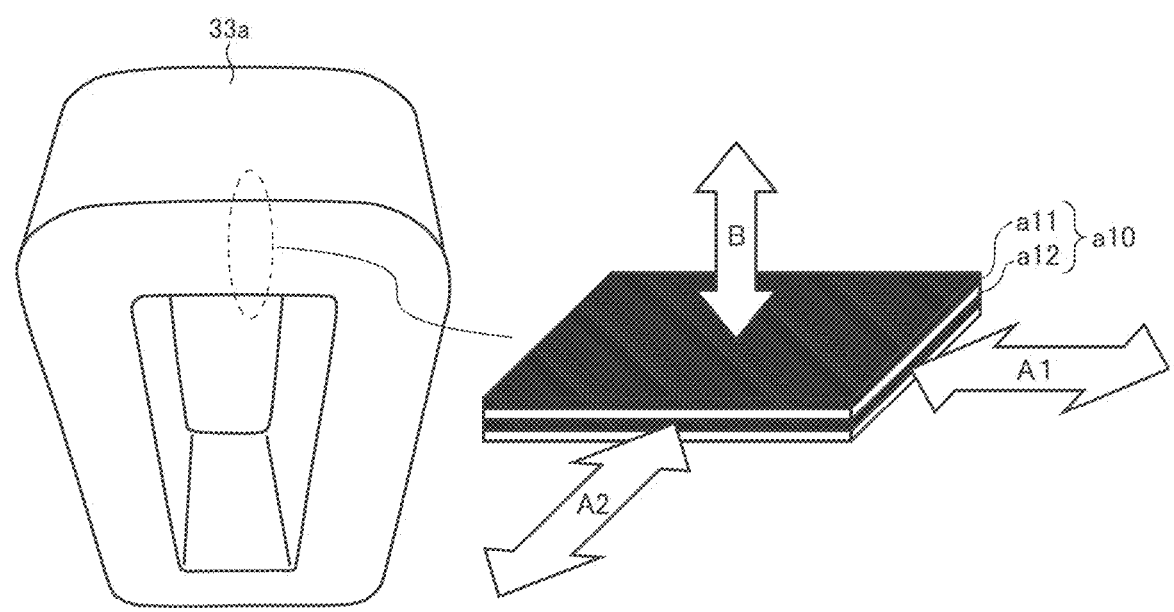
FIG. 12 is a schematic diagram illustrating an example of a core material having anisotropy in loss due to high frequency magnetic field.

FIG. 12 is a schematic diagram illustrating an example of the core material having anisotropy in the loss due to high frequency magnetic field. The first core section 33a illustrated in this diagram is made by winding a thin band member a10, which is a lamination of a magnetic material a11 (such as a steel sheet material for high voltage and large power) and an insulator a12, on a die many turns. Therefore, when viewing the first core section 33a from the cross section or from the side, layers of the magnetic material a11 and layers of the insulator a12 are layered alternately. Note that when forming the actual transformer-coupled reactor 30, the first core section 33a is divided in the up and down direction in FIG. 11 and is formed into two U-shaped portions, which are combined in use.

When this first core section 33a is viewed in an A1 direction or an A2 direction (i.e. in a direction of the normal to the cross-sectional direction or the side surface), the cross-sectional area of the magnetic material a11 is small, and hence the loss due to high frequency magnetic field is small. In contrast, when the first core section 33a is viewed in a B direction (i.e. in a direction of the normal to the upper surface), the cross-sectional area of the magnetic material a11 is large, and hence the loss is large because eddy current easily flows. In this way, the thin band member a10 is a material having anisotropy in the loss due to high frequency magnetic field (i.e. a material having a loss in the A1 direction and A2 direction different from a loss in the B direction). Therefore, in the first core section 33a formed using this, eddy current generated in the same has dependency on the direction of the magnetic flux.

With reference to FIGS. 10 and 11, description of the transformer-coupled reactor 30 is continued. In the transformer-coupled reactor 30 of this embodiment, the second core section 33b includes extending parts 33b1 and a main body part 33b2. The extending parts 33b1 extend upward and downward from the main body part 33b so as to cover at least a part of side surfaces of the upper beam part and the lower beam part of the first core section 33a (i.e. corresponding to the connection part α1 and β1).

In the connection parts α1 and β1, the magnetic shielding part 33c is a member that limits a path of magnetic flux passing between the first core section 33a and the second core section 33b to a side surface direction of the first core section 33a (i.e., corresponding to the A2 direction in FIG. 12). In other viewpoints, the magnetic sheilding part 33c can be said to be a member, which allows magnetic flux that is changing its direction between the A1 direction and the A2 direction in FIG. 13 to pass without shielding, while it shields magnetic flux that is changing its direction between the A1 direction and the B direction. Note that as illustrated in this diagram, the magnetic shielding part 33c should be disposed between the first core section 33a and the main body part 33b2.

With this structure, each of the magnetic flux split from the first core section 33a to the second core section 33b, and the magnetic flux joined from the second core section 33b to the first core section 33a changes its direction passing a path without a change in magnetic resistance (i.e. a path from the A1 direction to the A2 direction or a path from the A2 direction to the A1 direction in FIG. 12). Therefore, even if a material has anisotropy in loss due to eddy current is used as a material for forming the first core section 33a, generation of eddy current can be suppressed, and local heating can be minimized. Note that sheet copper or the like can be appropriately used for the magnetic shielding part 33c.

Further, the main body part 33b2 is formed to have a larger cross-sectional area (i.e. an area of a cross section perpendicular to the magnetic flux penetrating the second core section 33b) than the extending part 33b1. More specifically, the extending part 33b1 and the main body port 33b2 are formed to have flush outside surfaces, and the main body part 33b2 is protruded inside the first core section 33a so us to fill a cavity of the first core section 33a. With this structure, the cross-sectional area of the second core section 33b can be increased while minimizing an increase in size of the transformer-coupled reactor 30, and hence magnetic saturation hardly occurs in the second core section 33b.

Note that in this embodiment, a pair of the second core sections 33b are disposed so as to sandwich the first core section 33a from both side surfaces thereof. However, it is not always necessary to dispose the pair of second core sections 33b. If at least one of them is disposed, the above-mentioned function can be implemented.

Further, in this embodiment, the pair of main body parts 33b2 are opposed to each other with a gap between them, and a size of the gap is not matter. Further, basically, the gap is not an essential element, and the thicknesses of the main body parts 33b2 may be adjusted so that they contact each other.

Further, in this embodiment, the extending part 33b1 has a shape to cover the side surface of the first core section 33a partially in the up and down direction but it may have a shape to cover entirely.

Note that as a material of the first core section 33a, it is preferred to use a nanocrystalline soft magnetic material such as FINEMET (registered trademark) or NANOMET (registered trademark). As a material of the second core section 33b, it is preferred to use a magnetic material such as Liqualloy (registered trademark).

Transformer-Coupled Reactor (Second Embodiment)

Figure 13:
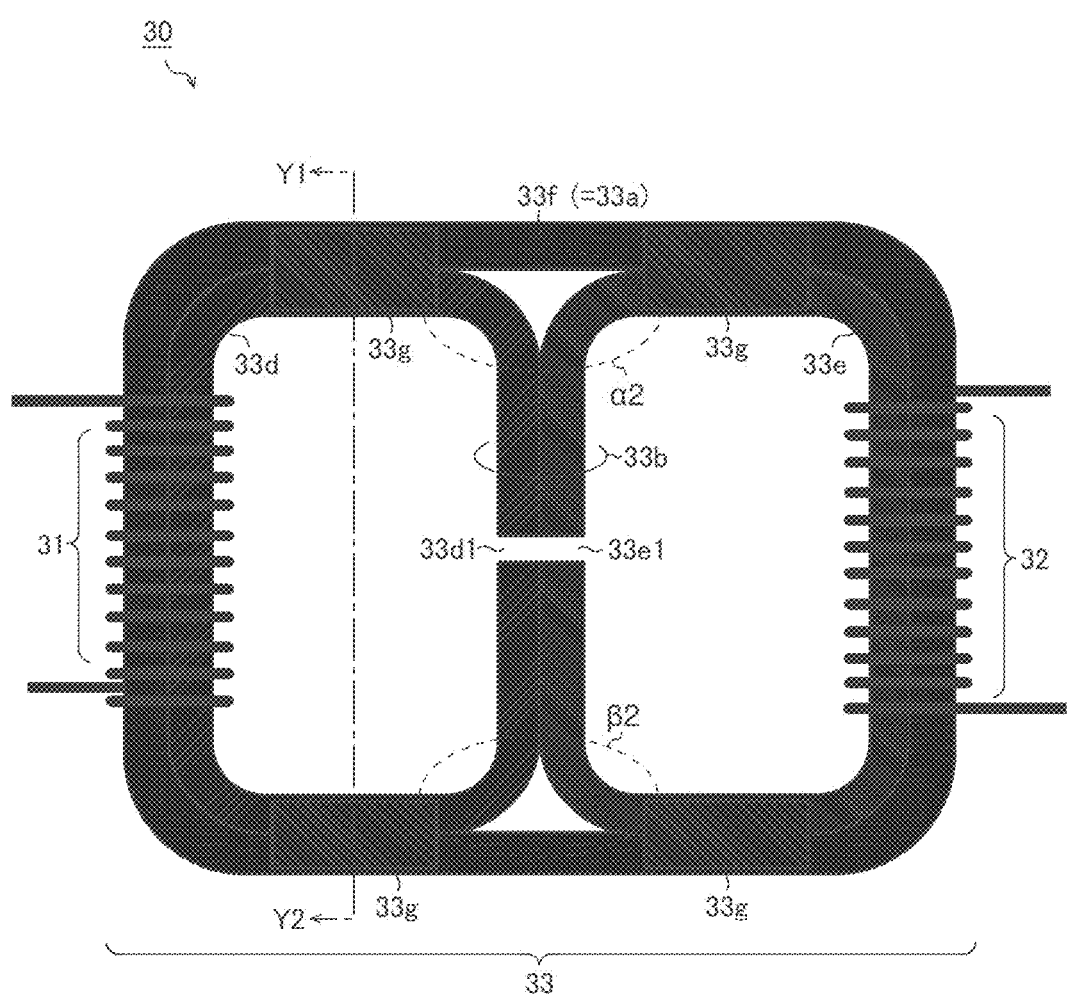
FIG. 13 is a schematic diagram illustrating a second embodiment of the transformer-coupled reactor.
Figure 14:
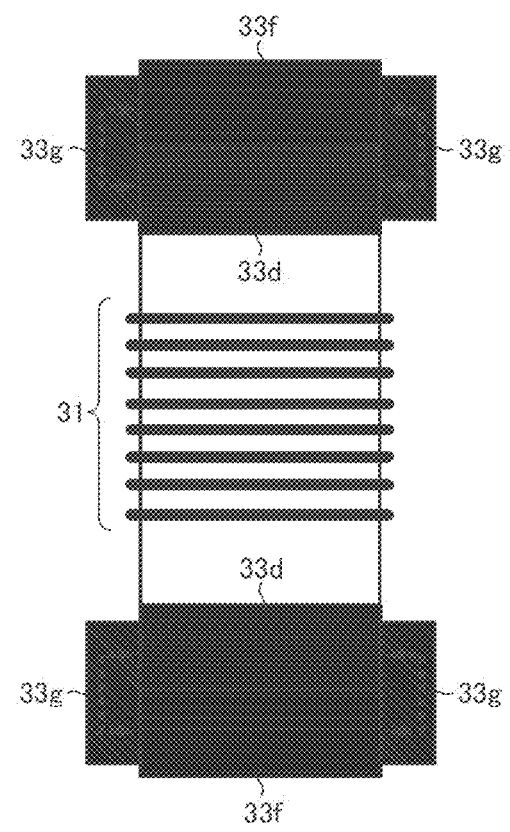
FIG. 14 is a vide view from a Y1-Y2 section direction.

FIG. 13 is a schematic diagram illustrating a second embodiment of the transformer-coupled reactor 30, and FIG. 14 is a longitudinal sectional view of the transformer-coupled reactor 30 (a side view from a Y1-Y2 section direction in FIG. 13). In the transformer-coupled reactor 30 of this embodiment, the core 33 is constituted of a combination of a first annular shape member 33d, a second annular shape member 33e, and a third annular shape member 33f. Note that the first annular shape member 33d, the second annular shape member 33e, and the third annular shape member 33f are made of the same material having anisotropy in the loss due to eddy current (see, for example, FIG. 12).

The first annular shape member 33d and the second annular shape member 33e are disposed side by side to partially contact each other. Further the third annular shape member 33f is disposed to enclose the first annular shape member 33d and the second annular shape member 33e along their outer peripheries.

This core 33 is manufactured in the following procedure. First, the thin band member a10 of FIG. 12 is wound on a die many turns, so that the first annular shape member 33d and the second annular shape member 33e are made separately, and they are disposed side by side. Then, the thin band member a10 of FIG. 12 is further wound many turns on them as a winding core, so that the third annular shape member 33f is made. Note that when forming the actual transformer-coupled reactor 30, the core 33 is divided in the up and down direction in FIG. 13 and is formed into two W-shaped portions, which are combined in use.

In the core 33 having the above-mentioned structure, the third annular shape member 33f functions as the first core section 33a described above. Further, the first annular shape member 33d and the second annular shape member 33e function as the second core section 33b described above.

Note that the first winding 31 is wound on the overlapping part of the first annular shape member 33d and the third annular shape member 33f. Further, the second winding 32 is wound on the overlapping part of the second annular shape member 33e and the third annular shape member 33f. In other words, the first winding 31 and the second winding 32 are wound on the first core section 33a in such directions that the magnetic fluxes generated in the same are cancelled with each other. Further, the second core section 33b is disposed so that magnetic flux passing the same causes leakage inductance of the transformer-coupled reactor 30. These points are the same as in the first embodiment (FIG. 10) described above.

Here, in the first annular shape member 33d and the second annular shape member 33e, then curving parts corresponding to the both ends of the second core section 33b can be understood to be a connection part α2, at which the magnetic fluxes are split from the first core section 33a to the second core section 33b, and a connection part β2, at which the magnetic fluxes are joined from the second core section 33b to the first core section 33a.

At the connection parts α2 and β2, the magnetic fluxes split from the first core section 33a to the second core section 33b, and the magnetic fluxes joined from the second core section 33b to the first core section 33a change the directions only along the curving directions of the first annular shape member 33d and the second annular shape member 33e, and the magnetic resistance in the penetrating direction thereof (i.e. cross-sectional area of the magnetic material) does not change at all.

With reference to FIG. 12, the magnetic fluxes penetrating the first core section 33a and the second core section 33b propagate along the A1 direction in which loss due to eddy current is small, and at the connection parts α2 and β2, the A1 direction itself changes its direction along the curving direction of the first annular shape member 33d or the second annular shape member 33e. Therefore, when splitting or joining of the magnetic flux occurs, magnetic flux is not generated in the B direction in which loss due to eddy current is large.

In this way, in the transformer-coupled reactor 30 of this embodiment, the first core section 33a and the second core section 33b are molded so that the loss due to eddy current does not change along the direction of the magnetic flux passing the same (i.e. the loss is always kept at a low value). Therefore, even if a material having anisotropy in the loss due to eddy current is used as the material making the first annular shape member 33d, the second annular shape member 33e, and the third annular shape member 33f (therefore the material making the first core section 33a and the second core section 33b), occurrence of eddy current can be suppressed, and local heating can be minimized.

Note that if it is necessary to adjust the leakage inductance, the cross-sectional area should be reduced in both the first annular shape member 33d and the second annular shape member 33e, or gaps 33d1 and 33e1 should be formed at positions opposed to each other, and an appropriate gap should be formed in the second core section 33b.

Further, in the transformer-coupled reactor 30 of this embodiment, the core 33 further includes third core sections 33g. Note that the third core sections 33g are disposed so as to cover at least a part of side surfaces of the first core section 33a and the second core section 33b, and so that the magnetic flux passing the same enables the magnetic fluxes generated in the first core section 33a and the second core section 33b to come and go each other.

More specifically with reference to FIG. 13, the third core sections 33g are glued with adhesive or the like, so as to cover at least a part of the side surfaces of the overlapping part of the first annular shape member 33d and the third annular shape member 33f, and of the overlapping part of the second annular shape member 33c and the third annular shape member 33f (e.g. at the upper beam part and at the lower beam part). In FIG. 13, the third core sections 33g separated for the first annular shape member 33d and for the second annular shape member are disposed. However the third core sections 33g in the diagram may be connected to each other, namely the third core section 33g may cover at least a part of the first annular shape member 33d, the second annular shape member 33e, and the third annular shape member 33f.

Note that as a material of the first annular shape member 33d, the second annular shape member 33e, and the third annular shape member 33f, it is preferred to use a nanocrystalline soft magnetic material such as FINEMET (registered trademark) or NANOMET (registered trademark). As a material of the third core section 33g, it is preferred to use a magnetic material such as ferrite.

As illustrated in FIG. 9, in the AC power supply device 1 of this structural example, a heavy load (large core loss) area in the transformer-coupled reactor 30 is clearly divided and timing at which core loss occurs in the first core section 33a is shifted from that in the second core section 33b.

More specifically, when DUTY is 0.5 (Vout is zero), the magnetizing component of the transformer-coupled reactor 30 (the large broken line B3 in FIG. 9) is maximum, and basically the core loss occurs and heat is generated in the first core section 33a (i.e. the third annular shape member 33f). On the other hand, when DUTY is zero or one (Vout=±E), a leakage component of the transformer-coupled reactor 30 (the solid line B1 in FIG. 9) is maximum, and basically the core loss occurs and heat is generated in the second core section 33b (i.e. the first annular shape member 33d and the second annular shape member 33e).

In particular, if the magnetic material a11 forming the first annular shape member 33d, the second annular shape member 33e, and the third annular shape member 33f is a steel sheet material, the magnetic fluxes passing the individual members are clearly separated, and the magnetic flux is trapped inside each of the first core section 33a and the second core section 33b.

Therefore, by disposing the third core sections 33g so that the magnetic fluxes can come and go between the first core section 33a and the second core section 33b, if one of them has light load (small core loss), it can receive a part of magnetic flux from the other and substantially increase the core cross-sectional area penetrating the magnetic flux, so that the load (core loss) can be shared. By making balance of the load (core loss) in this way, total core loss can be reduced, and magnetic saturation can be suppressed.

Transistor Bridge Control

Note that in the AC power supply device 1 described above, conduction loss is almost zero in an area of a small output power, and switching loss is dominant. Therefore, in the area having a small output power it is preferred to reduce the switching loss by reducing the operating frequency fx of the transistor bridge 20.

In this case, if the output power is lower than a predetermined threshold value, the operation of one of the two PWM control bridges of she transistor bridge 20 should be stopped. By performing this stop control, in the transformer-coupled reactor 30, a part that functions as the magnetizing inductance in normal operation can also be utilized as the smoothing reactor, and hence even if the operating frequency fx of the transistor bridge 20 is reduced so as to reduce the switching loss, the magnetic saturation can be suppressed.

On-duty Limitation

Figure 15:
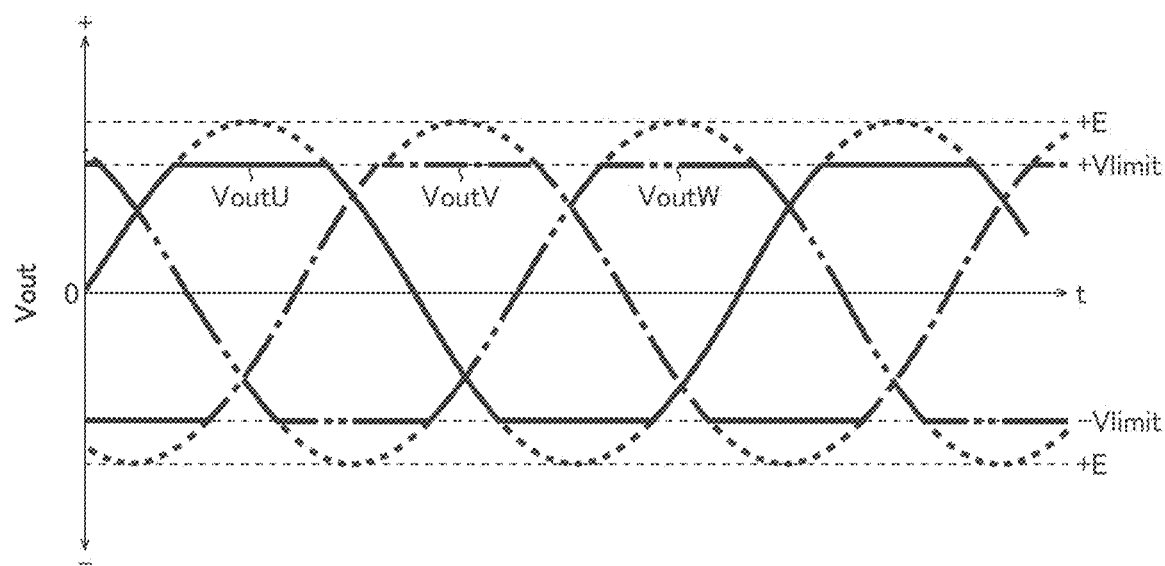
FIG. 15 is a diagram illustrating an example of on-duty limitation

Further, it is preferred that the AC power supply device 1 should hove a structure in which according to a comparison result between the AC output voltage Vout and a predetermined threshold value (±Vlimit), the on-duty DUTY of the switch elements 21 to 24 is limited. More specifically with reference to FIG. 15, in the output waveform of the AC output voltage Vout, particularly in an area where the AC output voltage Vout is close to the maximum value or the minimum value (±E) (|Vout|>Vlimit), it is preferred to limit an upper limit value or a lower limit value of the on-duty DUTY. By performing this on-duty limitation, distortion of the AC output waveform or ripple of the neutral point voltage VX may occur, but as trade-off, the switching loss can be reduced, and hence the entire efficiency of the AC power supply device 1 can be improved.

Application of Wide Bandgap Semiconductor (SiC, GaN)

Further, it is preferred that at least one of the switch elements 21 to 24 forming the transistor bridge 20 is made of a wide bandgap semiconductor (such as SiC semiconductor or GaN semiconductor).

Compared with a switch element made of Si semiconductor the switch element made of SiC semiconductor (such as a MOSFET) or GaN semiconductor (such as high electron mobility transistor or MOSFET) as described above can reduce parasitic capacitance such as the output capacitance and feedback capacitance, and hence an increase in switching loss in high frequency driving can be suppressed.

Further, by adopting the embodiment described above for the transformer-coupled reactor 30, even if the current is large (namely the power is large) so that magnetic saturation easily occurs when using a normal choke coil, it can be made compact. Therefore, the compact AC power supply device 1 having high efficiency and large power can be realized.

Further, by using an SiC-MOSFET as the switch element described above, high thermal conductivity can be obtained thanks to its low on-resistance and a vertical structure. Therefore, the AC power supply device 1 having large current and large power can be realized.

Further, the SiC-MOSFET has a small reverse recovery current of the body diode and a small parasitic capacitance, and hence an effective value of current can be reduced to a low value. Therefore, conduction loss of the switch element and the pattern, and copper loss of the transformer-coupled reactor 30 can be reduced.

In this way, the switch element made of the wide handgrip semiconductor has high withstand voltage, low on-resistance, and low switching loss, and this tendency is relatively maintained also at high temperature. Therefore, like the inverter method described above, even if the input voltage and the voltage directly applied to the switch element are high, a sufficiently thermally allowable operation can be performed.

Other Variations

Note that other than the embodiment described above, the various technical features disclosed in this specification can be variously modified within the scope of the technical invention without deviating from the spirit thereof. In other words, the embodiment described above is merely an example in every aspect, and should not be interpreted as a limitation. The technical scope of the prevent invention should be defined by not the above description of the embodiment but by the claims, and should be understood to include all modifications within the meaning and scope equivalent to the claims.

INDUSTRIAL APPLICABILITY

The AC power supply device disclosed in this specification can be used in very wide fields such as consumer products, industrial equipment, and in-vehicle products.

LIST OF REFERENCE SIGNS

1 AC power supply device
11, 12 input capacitor
20*, 20 transistor bridge
20*1, 20*2 PWM control bridge
21*, 22*, 23*, 24*, 21 to 24 switch element
30*, 30 transformer-coupled reactor
31*, 31 first winding
32*, 32 second winding
33*, 33 core
33*a* first core section
33*b* second core section
33*b*1 extending part (corresponding to connection part)
33*b*2 main body part
33*c* magnetic shielding part
33*d* list annular shape member
33*d*1 gap
33*e* second annular shape member
33*e*1 gap
33*f* third annular shape member
33*g* third core section
40*, 40 smoothing capacitor
E1 DC power supply
RL*, RL load
Lm1, Lm2 magnetizing inductance
Ls*, Ls1, Ls2, Ls smoothing reactor
T* autotransformer
a10 thin band member
a11 magnetic material
a12 insulator

The invention claimed is:

1. An AC power supply device comprising:
at least two input capacitors connected in series between a first power supply node and a second power supply node, so that a connection node thereof is a neutral point of a three-phase output;
three phases of transistor bridges each consisting of first and second PWM control bridges each including two switch elements connected in series between the first power supply node and the second power supply node;
three phases of transformers connected to output terminals of the three phases of transistor bridges, respectively;
three phases of reactors connected to the three phases of transformers, respectively; and
three phases of smoothing capacitors connected to the three phases of reactors, respectively, wherein
the three phases of transformers are single coil autotransformers, each including a core and first and second windings coupled with each other via the core, one ends thereof being connected to output terminals of the first and second PWM control bridges, respectively, while the other terminals being connected to the smoothing reactors on opposite sides to the smoothing capacitors, and
the first and second windings are wound in such directions that magnetic fluxes generated in the core are cancelled with each other.

2. The AC power supply device according to claim 1, wherein the first and second PWM control bridges turn on and off the switch elements with a phase difference of ½ period therebetween.

3. The AC power supply device according to claim 1, wherein the three phases of transformers and the three phases of reactors are formed as three phases of transformer-coupled reactors having both functions.

4. The AC power supply device according to claim 3, wherein
the core is constituted of a combination of at least a first core section and a second core section, and
the first and second windings are wound on the first core section in such directions that magnetic fluxes generated in the first core section are cancelled with each other.

5. The AC power supply device according to claim 4, wherein
the first core section is made of a material having anisotropy in loss due to high frequency magnetic field,
the second core section covers at least a part of a side surface of the first core section and is disposed so that magnetic flux passing through the same causes leakage inductance of the transformer-coupled reactor, and
the core further includes a magnetic shielding part arranged to limit a path of magnetic flux passing between the first core section and the second core section to a side surface direction of the first core section.

6. The AC power supply device according to claim 4, wherein
the core further includes a third core section,
the first and second core sections are made of a material having anisotropy in loss due to high frequency magnetic field and are molded so that the loss due to high frequency magnetic field does not change along a direction of magnetic flux passing the same,
the second core section is disposed so that magnetic flux passing the same causes leakage inductance of the transformer-coupled reactor, and
the third core section covers at least a part of side surfaces of the first and second core sections and is disposed so that magnetic flux passing the same enables magnetic fluxes generated in the first and second core sections to come and go each other.

7. The AC power supply device according to claim 1, wherein according to an output power, an operation of one of the first and second PWM control bridges is stopped, and an operating frequency of the switch element is changed.

8. The AC power supply device according to claim 1, wherein according to an output voltage, an on-duty of the switch element is limited.

9. The AC power supply device according to claim 1, wherein the switch element is made of a wide bandgap semiconductor.

10. The AC power supply device according to claim 1, further comprising three phases of load circuits having a neutral point connected to the other ends of the three phases of reactors, in which the neutral point is connected to the connection node of the two input capacitors.

11. An AC power supply device comprising:
two input capacitors connected in series between a first power supply node and a second power supply node;
first and second PWM control bridges each including two switch elements connected in series between the first power supply node and the second power supply node; and
a transformer including first and second windings, first ends of the first and second windings being connected, respectively, to output terminals of the first and second PWM control bridges, and second ends of the first and second windings being connected to one end of a load, wherein
another end of the load is connected to a connection node of the two input capacitors.

12. The AC power supply device according to claim 11, further comprising a smoothing capacitor connected in parallel to the load.

13. The AC power supply device according to claim 11, wherein
the transformer is single coil autotransformer, including a core and the first and second windings coupled with each other via the core, and
the first and second windings are wound in such directions that magnetic fluxes generated in the core are cancelled with each other.

14. The AC power supply device according to claim 11, wherein the first and second PWM control bridges turn on and off the switch elements with a phase difference of ½ period therebetween.

15. The AC power supply device according to claim 11, wherein according to an output power, an operation of one of the first and second PWM control bridges is stopped, and an operating frequency of the switch element is changed.

16. The AC power supply device according to claim 11, wherein according to an output voltage, an on-duty of the switch element is limited.

17. The AC power supply device according to claim 11, wherein the switch element is made of a wide bandgap semiconductor.

18. A transformer-coupled reactor in use for a power supply device, comprising:
a first core section formed in an annular shape;
a second core section disposed inside the annular shape of the first core section so that a part of the second core section has intimate contact with the first core section and that a first winding is wound on the first core section and the second core section;
a third core section disposed inside the annular shape of the first core section so that a part of the third core section has intimate contact with the first core section and that a second winding is wound on the first core section and the third core section;
a fourth core disposed to cover at least a part of side surfaces of the first core section and the second core section, so that magnetic flux passing the same enables magnetic fluxes generated in the first core section and the second core section to come and go each other; and
a fifth core disposed to cover at least a part of side surfaces of the first core section and the third core section, so that magnetic flux passing the same enables magnetic fluxes generated in the first core section and the third core section to come and go each other.

* * * * *